United States Patent [11] 3,627,574

[72] Inventors William T. Delong
West Manchester Township;
Edwin R. Szumachowski, Springettsbury
Township, both of Pa.
[21] Appl. No. 850,631
[22] Filed Aug. 15, 1969
[45] Patented Dec. 14, 1971
[73] Assignee Teledyne, Inc.
Los Angeles, Calif.

[54] COVERED LOW HYDROGEN ARC WELDING ELECTRODE
18 Claims, No Drawings
[52] U.S. Cl..................................................... 117/205,
117/206, 117/207, 117/221, 117/222, 117/227,
117/231
[51] Int. Cl....................................................... B23k 35/24,
B23k 35/34
[50] Field of Search........................................... 117/205,
206, 207, 221, 222, 231, 227

[56] References Cited
UNITED STATES PATENTS
3,423,565 1/1969 Malchaire..................... 117/206
2,798,824 7/1957 LeGrand et al................ 117/206
2,464,836 3/1949 Thomas et al. ................ 117/205

Primary Examiner—Alfred L. Leavitt
Assistant Examiner—M. F. Esposito
Attorney—Edward Hoopes, III ABSTRACT: A covered ferrous low hydrogen arc welding electrode of the class wherein a current conductive core is covered with a lime-fluoride coating, the electrode containing by weight about 45 percent to about 80 percent core and about 20 percent to about 55 percent coating, the coating containing by weight of the electrode 0 to about 30 percent alloying metal powder, about 2 percent to about 7 percent deoxidizer metal powder, about 4 percent to about 15 percent metal fluoride, about 5 percent to about 15 percent alkaline earth carbonate, 0 to about 10 percent slag builder and modifier and about 0.5 percent to about 8 percent inorganic binder material, the electrode producing a nonaustenitic steel weld metal deposit characterized by superior toughness in the Charpy V-notch impact test, the electrode containing base components selected from metallic and oxide forms of basic metals of the group consisting of lithium, sodium, potassium, cesium, magnesium, calcium, strontium and barium and acid components selected from metallic and oxide forms of acid metals of the group consisting of aluminum and silicon, said base components and acid components being so proportioned that when all components are melted together under the influence of an electric welding arc the electrode produces a welding slag with a basicity or mole ratio of oxide of basic metal to oxide of acid metal of at least 2.2, the electrode being restricted in sources of metallic and oxide forms of titanium so that when all components are melted together under the influence of an electric welding arc the electrode produces a weld metal deposit containing less than 0.07 percent titanium.

COVERED LOW HYDROGEN ARC WELDING ELECTRODE

This invention relates to covered arc welding electrodes; more particularly, it relates to the production of weld deposits by improved lime-fluoride electrodes with coatings of the type known as "low hydrogen" and classified by the American Welding Society in the classes E-XX15, E-XX18 and E-XX28, which are especially suited to produce nonaustenitic steel weld metal having unprecedentedly improved toughness as measured by the Charpy V-notch impact test without sacrifices in other characteristics such as electrode weldability or deposit strength, ductility and crack resistance.

In the production of weld deposits by means of lime-fluoride low hydrogen electrodes, prior workers have developed many concepts which are generally employed in such electrodes throughout the welding industry. While our invention teaches important new advances in the art it does not obviate the need to continue these well established principles to produce satisfactory welding electrodes. Since knowledge of this prior art is pertinent to a clear understanding of our invention, certain of it is reviewed here, primarily with respect to securing deposit toughness or impact strength. In addition, since the chemical composition of the resultant welding slag produced by our lime-fluoride electrode is importantly related to the description of our invention, some aspects of the present state of the art with respect to lime-fluoride electrode coating and welding slag terminology are presented.

As the commonly used term "lime-fluoride low hydrogen electrode" indicates, the coatings of such electrodes have very low moisture content and contain as their principal functional ingredients alkaline earth carbonate, usually calcium carbonate, and metal fluoride, usually calcium fluoride. Through the manipulation of these and other coating ingredients including slag builders and modifiers such as silicates and oxides, deoxidizer metal powder such as silicon, manganese, aluminum, etc., alloying metal powder and inorganic binder material, coating formulators have been able to obtain electrodes which produce welding slag compositions having the proper melting point, viscosity, wetting behavior, operator appeal, etc. Typically such lime-fluoride low hydrogen electrodes produce welding slags containing not less than 20 percent of fluoride, with about 30 percent to 60 percent fluoride being common. Adequate protective $CO_2$ gas to shield the arc from nitrogen of the air is supplied through the thermal decomposition of the carbonate in the coating during welding. In addition to supplying $CO_2$, the carbonate supplies oxide to the slag. Care is exercised in selecting non-hygroscopic ingredients low in water content for the coating; a final high baking temperature insures a coating of low total moisture content.

Commercially successful lime-fluoride low hydrogen electrodes producing non-austenitic steel weld deposits are covered by the three AWS class E-XX15, E-XX18 and E-XX28. Of these three classes, the E-XX15 may be considered the base, the other two in effect representing progressive transfer of metal from the core to the covering. The tabulation below lists the functional components contained in lime-fluoride low hydrogen electrodes of the three AWS classes and the normal limits of each component, expressed in percent by weight of the electrode, in finish-baked electrodes of each class:

The E-XX18, which is the most popular class, is used to illustrate our invention, although the invention is not limited to that class. By virtue of the fact that the greatly improved electrodes of our invention are of the lime-fluoride low hydrogen type, they too contain the above described necessary functional components common to all electrodes of this type.

The weld metal deoxidation level of nonaustenitic lime-fluoride electrodes, measured primarily by the silicon level recovered in the deposit, is customarily adjusted through additions of deoxidizer metal powder to the coating to provide a good balance between soundness and mechanical properties in the weld metal. A deposit silicon level below about 0.25 percent is usually detrimental to both impact strength and welding operation. The optimum silicon level is usually between about 0.3 percent and 0.5 percent, depending somewhat on the overall deposit analysis; as the deposit silicon increases above 0.5 percent welding operation usually remains good or may even improve, but the deposit impact strength generally deteriorates. Deoxidizer metals in the coating or core react with available carbon dioxide from carbonate in the coating or with oxygen from the air to produce oxides which go into the slag. Strong deoxidizers, for example aluminum, titanium, zirconium and the rare earth metals, are almost completely oxidized unless they are present in large amounts; under favorable conditions small proportions of these do go into the weld metal. Weaker deoxidizers such as silicon and manganese tend to go more equitably to the slag as oxides and to the weld metal as alloying elements.

The slag composition produced by a covered arc welding electrode is a product of the reactions which occur between the metallic core, flux coating materials and arc atmosphere during welding. Certain welding slags are described as "acid," while other slags, such as those produced by lime-fluoride welding electrodes, are termed "basic." Depending upon the source, the imprecise term "basic" means that the ratio, expressed in percent or in moles, between the oxide content in the slag of metals considered basic and that of metals considered acid is greater than 1. In our work we define lithium, sodium, potassium, cesium, magnesium, calcium, strontium and barium as basic metals and silicon and aluminum as acid metals. Other commonly employed oxides such as titanium oxide and salts such as fluorides are considered neutral in their effect on slag basicity, which we define as the ratio of moles of oxide of basic metal to moles of oxide of acid metal present in the slag. Using our definition, successful lime-fluroide electrodes of the prior art have produced slags having basicities ranging from 1.2 to about 1.9.

The basicity of a lime-fluoride low hydrogen welding slag composition may either be determined directly from its chemical analysis or be closely approximately by a "slag basicity calculation." The latter method requires a knowledge both of the compositions of the weld deposit and the metallic core of the electrode and of the flux materials and how they behave in the welding process; it can best be described by carrying out one such basicity calculation for an AWS E-7018 type low hydrogen covered electrode typical of the prior art. In this example a 5/32 inch diameter mild steel core wire was extrusion coated with a coating mixture comprising the ingredients and amounts shown in table 1. The finished electrode contained about 35 percent covering and about 65 percent core by weight. From the chemistry of the deposit and the chemistry of the core wire it can be determined what metal was oxidized and what was recovered; knowing this and the compositions and weights of the coating ingredients and ignoring the small fume losses, the amounts of oxides of acid and basic metals in the slag composition which are of special interest can be calculated as shown in table I. The total moles of oxides of basic and acid metals are 0.285 and 0.206 respectively for this example, and they are then used to calculate the base-to-acid mole ratio or slag basicity, which is 1.38.

| | | Percent | | | | | |
|---|---|---|---|---|---|---|---|
| AWS Class | Core | Alloying metal powder | Deoxidizer metal powder | Metal fluoride | Alkaline earth carbonate | Slag builder and modifier | Inorganic binder |
| E-XX15 | 70-80 | 0-5 | 2-7 | 4-15 | 5-15 | 0-10 | 0.5-8 |
| E-XX18 | 55-72 | 5-15 | 2-7 | 4-15 | 5-15 | 0-10 | 0.5-8 |
| E-XX28 | 45-55 | 20-30 | 2-7 | 4-15 | 5-15 | 0-10 | 0.5-8 |

TABLE I

[Calculation of welding slag produced by basicity of typical 5/32" 7018 low hydrogen electrode]

| Coating ingredient | Wt. of coating ingredient in grams | Acid and base oxide contribution to slag in grams | | | | |
|---|---|---|---|---|---|---|
| | | SiO₂ | Al₂O₃ | CaO | K₂O | Na₂O |
| Potassium titanate | 6.7 | .07 | .07 | | 1.27 | .07 |
| Calcium fluoride | 24.3 | .74 | | | | |
| Ferro silicon-Si to deposit | 1.5 | | | | | |
| Ferro silicon-Si oxidized | 1.5 | 1.56 | | | | |
| Ferro manganese | 5.5 | .10 | | | | |
| Ferro titanium | 2.34 | .67 | .15 | | | |
| Alumina | 1.14 | | 1.14 | | | |
| Calcium carbonate | 19.6 | .35 | | 10.85 | | |
| Iron powder | 33.5 | | | | | |
| Sodium bicarbonate | .2 | | | | | .07 |
| Wollastonite | 3.72 | 1.91 | | 1.76 | | |
| Total dry materials | 100.00 | | | | | |
| Mixed alkali silicate binder | 21cc | 6.14 | | | 1.81 | 1.47 |
| Total oxides | | 11.54 | 1.36 | 12.61 | 3.08 | 1.61 |
| Moles | | .193 | .013 | .226 | .033 | .026 |
| Effect | | Acid | Acid | Base | Base | Base |

$$\frac{\text{Total base in moles}}{\text{Total acid in moles}} = \frac{.285}{.206} = 1.38$$

As previously indicated, successful lime-fluoride low hydrogen electrodes of the prior art have produced slag basicities in the range of about 1.2 to about 1.9. This range of values has been promoted by several factors. The silicate binder contributes an appreciable amount of silica, and the conventional ferro-silicon deoxidation, which is effective, cheap and convenient, contributes more. The alkali oxides Na₂O and K₂O are limited in quantity partly because of their effect on operation and partly because it is difficult to obtain material rich in these oxides yet with low water content and low tendency to rehydrate. The calcium carbonate can be increased, but the increased carbon dioxide thus generated requires a corresponding increase in deoxidation, usually through an increase in ferrosilicon, which adds more acid oxide to the slag. Sometimes aluminum may be used for deoxidation, but its oxide residue is also acid in the slag. Thus it can be seen that lime-fluoride low hydrogen electrodes of the prior art have had their slag basicities depressed by conventional practices in the areas of binder and deoxidation; in the few cases where basicity has been raised, the potential benefits to the produced weld deposits have been largely dissipated by the immoderate use of titanium.

As modifiers for controlling and adjusting the properties of lime-fluoride welding slags, the oxides of aluminum, titanium and zirconium have been commonly employed. They may be introduced into the slag melt via the electrode either as the oxides or in equivalent forms, e.g., associated with another oxide as oxide of titanium is in potassium titanate. Note the example in table 1. Typical ranges for these modifiers have been up to 8 percent alumina, up to 12 percent zierconia and up to 15 percent titania by weight of the slag. If introduced in some metallic form for deoxidation purposes, after the metals have served this function their oxide residues appear in the slag where they exert their usual effects.

The effects of the metal aluminum, titanium and zirconium on the mechanical properties of the weld deposit have in the past been associated with deoxidation, denitrification and with small alloying concentrations, particularly of titanium, recovered in the deposit. When a lime-fluoride electrode composition provides the setting for the use of these strong deoxidizer metals the efficiency of recovery varies with position in the electrode, a coating position being less efficient than one in the core which is more protected during arc transfer.

For some time it has been apparent that all prior art lime-fluoride low hydrogen covered electrode compositions, even though including the most skillful combinations of deoxidizers, have become virtually stalled in their progress toward further significant improvements in the impact resistance of nonaustenitic steel weld metals; moreover, the best weld deposits produced with prior art electrodes of this type have often inadequate or marginally acceptable in impact strength and thus restricted to the less critical applications. Some deposits, such as the 2-½ percent and 3-½ percent nickel types, are often marginal in toughness at −150° F. when produced by downhand welding and are not acceptable when produced by vertical welding; comparable plate materials are satisfactory at −150° F. 9 percent nickel ferritic covered electrodes producing deposits which match 9 percent nickel plate in toughness at −320° F. have been unavailable. Higher strength weld deposits, such as those produced with the best currently available E-14018 electrodes for use with tough wrought steels having 130 k.s.i. minimum yield strength, have been marginal in toughness. The toughness of low alloy Cr-Mo deposits, e.g., those from AWS E-9018B3 electrodes, should be better to minimize the risks of brittle failure. Heat-treatable or stress-relievable deposits with strength and toughness both at desired high levels are often not available.

In view of the above described situation, it can be seen that there has been a clear and pressing need for covered electrodes which can produce nonaustenitic steel weld metal with superior toughness without sacrificing weldability, strength, ductility, crack resistance or other desirable properties.

We have found that improved nonaustenitic steel weld deposits with superior toughness can be produced with low hydrogen lime-fluoride covered electrodes by combining proper deoxidation practices with new approaches to welding slag composition which are inherently favorable to high impact strength. Additional benefits may be obtained by employing titanium in various forms in the electrode according to our directions.

We provide a covered ferrous low hydrogen arc welding electrode of the class wherein a current conductive core is covered with a lime-fluoride coating, the electrode containing by weight about 45 percent to about 80 percent core and about 20 percent to about 55 percent coating, the coating containing by weight of the electrode 0 to about 30 percent alloying metal powder, about 2 percent to about 7 percent deoxidizer metal powder, about 4 percent to about 15 percent metal fluoride, about 5 percent to about 15 percent alkaline earth carbonate, 0 to about 10 percent slag builder and modifier and about 0.5 percent to about 8 percent inorganic binder material, the electrode producing a nonaustenitic steel weld metal deposit characterized by superior toughness in the Charpy V-notch impact test, the electrode containing base components selected from metallic and oxide forms of basic metals of the group consisting of lithium, sodium, potassium, cesium, magnesium, calcium, strontium and barium and acid components selected from metallic and oxide forms of acid metals of the group consisting of aluminum and silicon, said base components and acid components being so proportioned that when all components are melted together under the influence of an electric welding arc the electrode produces a welding slag with a basicity or mole ratio of oxide of basic metal to oxide of acid metal of at least 2.2, and preferably at least 3, the electrode being restricted in sources of metallic and oxide forms of titanium so that when all components are melted together under the influence of an electric welding arc the electrodes produces a weld metal deposit containing less than 0.07 percent titanium, and preferably less than 0.045 percent titanium.

We also provide a method of producing an improved nonaustenitic steel weld deposit characterized by superior toughness in the Charpy V-notch impact test by melting a covered ferrous low hydrogen arc welding electrode consisting of a current conductive core and a lime-fluoride coating, which method consists of proportioning the core and coating components containing metallic and oxide forms of the basic metals lithium, sodium, potassium, cesium, magnesium, calcium, strontium and barium and of the acid metals aluminum and silicon so that when all components are melted together under the influence of an electric welding arc they produce a weld metal deposit and a welding slag with a basicity or mole ratio of oxide of basic metal to oxide of acid metal of at least 2.2, and preferably at least 3, and restricting the sources of metallic and oxide forms of titanium in the electrode so that the weld metal deposit contains less than 0.07 percent titanium, and preferably less than 0.045 percent titanium.

We further provide in preferred embodiments of the invention that the high slag basicity is promoted by supplying part or all of the required electrode deoxidation by magnesium in metallic form.

We further provide in other preferred embodiments of the invention limits described hereinafter on the presence of titanium as oxide and metallic titanium in improved lime-fluoride electrodes of the invention in order to control and to maximize toughness in the weld deposit.

We further provide in other embodiments of the invention that the current conductive core of the electrode may be of commercial mild steel.

Our improved electrode produces unprecedentedly tougher weld deposits than have heretofore been available from the best lime-fluoride low hydrogen covered electrodes. The degree of improvement depends upon the alloy system used, some alloy systems showing much improvement than others as our examples will demonstrate. With a given alloy system the advantages are obtained to a lesser degree as the outer limits of the invention are approached. The typical maximum degree of improvement varies in general from about 30 percent to several hundred percent. Covered electrodes have heretofore been regarded as having less potential than either gas metal arc or gas tungsten arc welding processes, based on the previously attainable deposit toughness. The major improvement in deposit toughness obtained with our invention, coupled with availability of welders skilled in the shielded arc process and the general ease of use, dependability and low cost of covered electrodes makes such electrodes leading contenders for the high quality applications whereby they have been lagging or are being phased out.

Other details, objects and advantages of the invention will become apparent as the following description of certain present preferred embodiments thereof and certain present preferred methods of practicing the same proceeds.

EXAMPLE 1

An AWS E-11018 type was prepared from the following flux composition, which was applied to a standard commercial quality 5/32 inch diameter C-1008 mild steel conductive core wire and then baked to a low water content. The covering comprised about 35 percent of the electrode weight and contained sufficient alloy to meet the E-11018 deposit strength requirements.

| Dry ingredients | |
| --- | --- |
| Calcium carbonate | 20.0 grams |
| Calcium fluoride | 43.3 grams |
| Magnesium metal | 2.7 grams |
| 50% ferrosilicon | 5.0 grams |
| 40% ferrotitanium | 0.13 grams |
| Nickel | 4.37 grams |
| 65% ferromolybdenum | 1.5 grams |
| Iron powder | 19.3 grams |
| Manganese metal | 3.7 grams |
| Total dry ingredients | 100.0 grams |
| Wet ingredients (binder) | |
| Water | 11.90 grams |
| Organic extrusion aid | 1.52 grams |
| Potassium hydroxide | 0.67 grams |
| Sodium aluminate (40% sodium oxide, 31% aluminum oxide, 23% water) | |
| Total wet ingredients | 16.00 grams |

This electrode used a sodium aluminate binder of the type described in copending application Ser. No. 706,681, filed Feb. 19, 1968 now U.S. Pat. No. 3,501,354.

A calculation similar to that shown in table 1 shows that this electrode produces a welding slag with the unprecedentedly high basicity of 4.42; the greatly improved impact properties of the metal which it deposits are shown in table II where they are compared with those of an essentially equivalent deposit representative of the prior art.

TABLE II

| | Prior Art E-11018 | | Invention Example 1 | |
| --- | --- | --- | --- | --- |
| Electrode slag basicity | 1.48 | 4.42 | | |
| Hardness, Rockwell "C" Scale | | | 29 | 33 |
| Charpy V-notch, ft.-lbs. | | | | |
| Room Temperature | 85 | | 143 | |
| −100° F. | 39 | 77 | | |
| −150° F. | 8 | | 43 | |
| Deposit Chemistry, % | | | | |
| Carbon | 0.086 | | 0.092 | |
| Manganese | 1.55 | | 1.81 | |
| Silicon | 0.40 | | 0.36 | |
| Nickel | 1.6$^d$ | | 1.76 | |
| Chromium | 0.4$^d$ | | 0.36 | |
| Titanium | <0.045$^d$ | | <0.045$^d$ | | d—derived from alloy recovery curves

The alloy content of the weld deposit of example 1 happens to be slightly higher than the prior art E-11018 deposit and therefore is of somewhat higher hardness. This increase in hardness would be expected to reduce the impact strength, but it can be seen that our invention brings about substantial increases in impact strength, on the order of from 68 percent to over 400 percent depending on the testing temperature. Of particular importance is the fact that our invention may employ standard commercial quality core wire and does not require the use of expensive high purity wires.

EXAMPLE 2

A second electrode of our invention was prepared using the following flux composition, which was applied to a standard commercial quality 5/32 inch diameter C-1008 mild steel core wire and then baked to a low water content. The coating comprised about 35 percent of electrode weight and contained sufficient alloy to produce a 3-½ percent nickel low alloy type deposit.

| Dry ingredients | |
| --- | --- |
| Potassium titanate | 4.1 grams |
| Strontium carbonate | 14.7 grams |
| Calcium carbonate | 20.3 grams |
| Calcium fluoride | 24.3 grams |
| Magnesium metal | 2.0 grams |
| 50% ferrosilicon | 5.7 grams |
| Nickel | 7.6 grams |
| Manganese | 0.7 grams |
| Iron | 20.6 grams |
| Total dry ingredients | 100.0 grams |
| Wet ingredients (binder) | |
| 12.0 cc. of a mixed alkali silicate containing: | |
| Silicon dioxide | 5.30 grams |
| Sodium oxide | 1.24 grams |
| Potassium oxide | 1.33 grams |

A calculation for this electrode shows a welding slag basicity of 2.59.

Listed in table III are comparative data on the deposit of this new 3-½ percent nickel electrode and that of a representative prior art electrode.

TABLE III

| | Prior Art | Example 2 |
| --- | --- | --- |
| Electrode slag basicity | 1.48 | 2.59 |
| Hardness, Rockwell "C" Scale | 21 | 20 |
| Charpy V-notch ft.-lbs. | | |
| Room Temperature | 146 | 161 |
| −100° F. | 54 | 101 |
| −150° F. | 22 | 38 |
| Deposit Chemistry, % | | |
| Carbon | 0.059 | 0.073 |
| Manganese | 0.67 | 0.66 |
| Silicon | 0.33 | 0.41 |
| Nickel | 2.98 | 3.0$^d$ |
| Titanium | <0.045$^d$ | <0.045$^d$ | d—derived from alloy recovery curves

Example 2 shows a distinct improvement in deposit toughness over the prior art, especially at low temperatures, in spite of only a modest elevation of slag basicity to 2.59.

As examples 1 and 2 respectively illustrate, the improved electrodes of our invention may have a coating bonded with an alkali aluminate or an alkali silicate. Both examples 1 and 2 also illustrate successful embodiments of our invention which employ a well-balanced group of deoxidizer metals, one of which, metallic magnesium, is a convenient and practical deoxidizer whose oxide residue importantly serves to increase the basicity of the welding slag. In the coating of example 2, if the two grams of metallic magnesium were to be replaced by 2 grams of 50 percent ferrosilicon the slag basicity ratio would be reduced from 2.59 to 1.70, which is no higher than that of typical prior art electrodes. In the coating of example 1 with an aluminate binder, the effect is similar. Use of 2.7 grams of magnesium instead of 2.7 grams of 50 percent ferrosilicon, in conjunction with the substitution of an aluminate binder for conventional silicate binder, has increased the slag basicity from about 1.75 to the 4.42 value shown. In example 1, if magnesium were not used to carry a substantial portion of the deoxidation load, i.e., if ferrosilicon alone were used, the basicity of the slag would approximate our broad lower limit of 2.2 minimum required by our invention. With the use of magnesium the desired minimum basicities are readily exceeded.

EXAMPLE 3

A third electrode of our invention was prepared using a coating similar to example 1 but with a higher calcium carbonate level and other minor changes. The covering, listed below, comprised about 35 percent of the electrode weight and contained sufficient alloy to meet E-14018 deposit strength requirements.

| | |
|---|---|
| Calcium carbonate | 29.9 grams |
| Calcium fluoride | 29.3 grams |
| Magnesium metal | 3.2 grams |
| 50% ferrosilicon | 6.3 grams |
| Rutile | 1.4 grams |
| Nickel | 5.4 grams |
| 65% ferromolybdenum | 1.8 grams |
| 70% ferrochromium | 2.2 grams |
| Manganese metal | 2.0 grams |
| Iron powder | 15.5 grams |
| Manganese oxide | 2.4 grams |
| CMC (extrusion aid) | 0.6 grams |
| Total dry ingredients | 100.0 grams |

The binder was like that of example 1 but without the potassium hydroxide.

The greatly improved impact properties of this E-14018 weld metal over typical prior art E-14018 weld metal are shown in table IV.

TABLE IV

| | Prior art 14018 | Invention Example 3 |
|---|---|---|
| Electrode slag basicity | 1.5 | 4.5 |
| Hardness, Rockwell "C" Scale | 37 | 37 |
| Charpy V-notch, ft.-lbs. | | |
| Room Temperature | 50 | 79 |
| 0° F. | | 73 |
| −60° F. | 35 | 60 |
| Strength | | |
| Ultimate strength, K s.i. | 147 | 159 |
| Yield strength, K s.i. | 142  141 | |
| Elongation, % | 18 | 19 |
| Deposit Chemistry, % | | |
| Carbon | 0.08 | 0.074 |
| Manganese | 1.90 | 1.77 |
| Phosphorus | 0.006 | 0.004ª |
| Sulfur | 0.005 | 0.003ª |
| Silicon | 0.43 | 0.41 |
| Chromium | 0.55 | 0.78 |
| Nickel | 2.00 | 2.59 |
| Molybdenum | 0.42 | 0.49 |
| Titanium | <0.045ᵈ | <0.045ᵈ | a—average of tests in a series of experiments
d—derived from alloy recovery curves The two deposits are quite similar in hardness and yield strength, yet that from the electrode of our invention is 58 percent and 72 percent higher in Charpy V-notch values, at room temperature and −60° F. respectively, than that from the low basic prior art electrode.

In the absence of metallic magnesium, other modifications may be made to the coating of our electrodes to raise the slag basicity. One such modification is the use of stable forms of magnesium oxide. Others may include reduction of the binder silica content by using lower amounts of binder or diluted binder, further increase in the alkali level through the use of hydroxides, carbonates or titanates within permissible limits, substitution of other deoxidizers for silicon, such as calcium, lithium (although these two metals pose problems due to reactivity with the binder, as is understood by those skilled in the art), titanium (within the limitations imposed by its effect on impact properties) or the rare earth metal family (mischmetal) to a limited extent, and other expedients. With the use of combinations of these techniques, the slag basicity produced by a lime-fluoride electrode can be increased above our broad limit of 2.2 into more favorable areas than have heretofore been commonly used in the art, bearing in mind that commercial standards of coating toughness and electrode operation must be maintained. The use of metallic magnesium makes the attainment of favorable slag basicity much easier than the use of some of the alternatives described.

Past investigators have recognized that the use of the metals titanium, aluminum and zirconium in wires for gas shielded or submerged arc welding has influenced the impact strength of the weld metals. However, we have found that in lime-fluoride covered electrodes titanium is the most effective in influencing weld toughness, with aluminum and zirconium of only secondary interest provided an excess is avoided, e.g., we have found a weld deposit aluminum content greater than about 0.03 percent to be harmful. We provide for limitations on the amount of titanium in the metallic and oxide form in the improved lime-fluoride electrodes of our invention, such limitations being dependent upon both the amount of carbon dioxide released by the coating and the basicity of the welding slag produced. In the predominantly carbon dioxide atmosphere derived from the carbonate content of the electrode coating, a metallic form of titanium would be expected to oxidize readily and to be scarcely recovered in the weld; even less expected would be the reduction of titanium oxide. In the welding field experts in the prior art have variously regarded titanium dioxide to be acidic, amphoteric or neutral in the slag. If acidic or amphoteric, it would be expected to be more closely and readily held in a highly basic slag than in a more acid slag; thus the amount of titanium in the weld metal in equilibrium with a given amount of titanium dioxide in the slag would be expected to decrease as the basicity of the slag increased (the equilibrium between silicon in weld metal and silicon dioxide in the slag behaves in this manner). Unexpectedly, the reverse has been found to be true, i.e., as the basicity of the slag increases the amount of titanium recovered in the weld metal increases for a given amount of titanium either as metal or as oxide present in the electrode.

Examples of improved impact strengths attainable through the controlled use of titanium in various common forms are shown in table V, which lists test results for deposits from a series of 5/32 inch 10018 type electrodes producing a slag basicity of about 4.5 and made approximately as the electrode of example 1. All electrodes carried requisite additions of alloy; examples 5, 6 and 7 embody additions of optimum amounts of titanium in different forms to the coating of example 4, the titanium-free base composition of the series. All electrodes were tested under standard conditions and produced deposits with a hardness of about 25 Rc, a yield strength of about 90,000 p.s.i. and a deposit chemistry of about 0.07 percent carbon, 1.1 percent manganese, 0.4 percent silicon, 1.7 percent nickel, 0.4 percent chromium and 0.3 percent molybdenum.

TABLE VI-A

| Slag basicity | Maximum quantity of titanium present in the coating either as oxide or as metal to produce improvement over base | | |
|---|---|---|---|
| | Percent electrode titanium as oxide (Column A) | Percent electrode titanium as metal (Column B) | Average ratio Col. A/Col. B |
| Less than 3 | 1.54 | .73 | 2.11 |
| 3-4 | 1.20 | .45 | 2.67 |
| Over 4 | .95 | .32 | 2.97 |
| Average | | | 2.59 |

TABLE VII

| Slag basicity range | Maximum value [1] |
|---|---|
| Less than 3 | 1.71 |
| 3-4 | 1.18 |
| Over 4 | .89 |

[1] For expression "percent electrode titanium as oxide present in the coating plus 2.6 times percent electrode titanium as metal present in the coating" to produce improvement over base.

TABLE VIII

| Slag basicity | Grams $CaCO_3$ in the coating | Grams $CO_2$ in the coating | Percent electrode $CO_2$ present in the coating | Ranges of titanium present in the coating either as oxide or as metal to produce optium low temperature impact improvement | | | | |
|---|---|---|---|---|---|---|---|---|
| | | | | Percent electrode titanium as oxide present in the coating | Percent electrode titanium as metal present in the coating | Percent electrode titanium as oxide, percent $CO_2$ (Col. A) | Percent electrode titanium as metal, percent $CO_2$ (Col. B) | Average ratio Col. A/Col. B |
| 1.79 | 31.7 | 13.6 | 4.75 | .15-.56 | .021-no data | .031-.119 | .0044-no data | |
| 2.44 | 20.0 | 8.6 | 3.02 | .105-.36 | .0105-.038 | .035-.119 | .0035-.0128 | 11 |
| 3.9 | 20.0 | 8.6 | 3.02 | No data | .0105-.028 | No data | .0035-.0093 | |
| 4.5 | 31.7 | 13.6 | 4.75 | .27-.73 | .0175-.056 | .057-.154 | .0037-.0118 | |
| 4.5 | 20.0 | 8.6 | 3.02 | .105-.42 | .0105-.038 | .035-.140 | .0035-.0128 | |
| Average | | | | | | .039-.133 | .0037-.0116 | |

It is well known to those familiar with the state of covered electrode art that some forms of titanium dioxide in the coating, preferably titanium dioxide pigment but sometimes rutile or potassium titanate, are beneficial to operator appeal. While titanium dioxide is desirable from this viewpoint and does help impact values when used in the proportions we have defined, the beneficial effects which it confers on deposit toughness are not quite as strong at the lowest test temperatures as those conferred by metallic sources of titanium. However, if only metallic titanium is used in the coating, the optimum level is so low that the amount of titanium dioxide obtained from the oxidation of the excess titanium is insufficient to have the desired beneficial effect on operation. We have found that it is usually desirable to balance the coating to obtain as much as practical of the desired effect of titanium dioxide as an operation improver and some of the effect of metallic titanium as the preferred low temperature toughness improver by combining the two in the coating as shown in table IX. This combination, which provides a good balance of properties, assumes a normal rimmed steel electrode core wire, essentially free of titanium.

TABLE IX

| | Minimum | Maximum |
|---|---|---|
| (a) % electrode titanium as oxide present in the coating | 0.05 | 0.11 |
| (b) % electrode $CO_2$ present in the coating 11 times % electrode titanium as metal present in the coating | 0.02 | 0.07 |
| % electrode $CO_2$ present in the coating (a) plus (b) (which must lie between 0.04 and 0.13) | 0.07 | 0.13 |

Metallic elements recoverable in the deposit may either be present in the flux coating of the electrode or be alloyed or enclosed in the conductive core. This is true of metallic titanium in improved lime-fluoride electrodes of our invention, but the use of special analysis titanium-bearing core instead of plain mild steel, while technically feasible, greatly increases the cost of the electrodes without returning any significant advantage. There is some slight compensation in the fact that metallic titanium in the coating may be replaced by about ¼ less titanium in the core because of the more protected position and improved efficiency of recovery; this factor may be checked by a few tests in case titanium in the core should be substituted for the quantities of metallic titanium specified in the coating of our improved electrodes.

Directions have been given for determining how much titanium must be added to highly basic lime-fluoride electrodes of our invention to produce optimum deposit impact strength at low temperatures. The cleaner more purified weld deposit produced with our invention derives optimum benefit from a titanium content of about 0.016 percent if the titanium in the electrode is present in oxide form, of about 0.004 percent if the titanium in the electrode is present in metallic form, and of intermediate value if both forms are present. The deposits of examples 5, 6 and 7 herein had titanium contents of 0.024 percent, 0.02 percent and 0.003 percent respectively. Directions have also been given for finding the maximum titanium which can be added to the improved electrodes of our invention before the deposit toughness falls below that of corresponding titanium-free base deposits. At this maximum titanium level the deposit impact strength may still be far superior to that of prior art deposits and at the sacrifice of some of this margin additional titanium may be added for operational or other reasons. This results in higher titanium contents in the deposit and, as has been pointed out, the recovery of titanium is especially good for electrodes with highly basic slags. Therefore, to prevent the abuse of our invention through additions of titanium which reduce the deposit impact strength to the level of prior art electrodes, it is necessary to put a restriction on the maximum deposit titanium which is broadly about 0.07 percent and preferably about 0.045 percent.

Alloy systems used in nonaustentici weld metal deposits differ among themselves in their inherent ranges of toughness and while our invention has beneficial effect on many alloy systems it will not transform a poor alloy system into an excellent one.

The 2-½ percent chromium –1 percent molybdenum heat-treatable, stress-relievable alloy deposited by AWS E-9018B3 class electrodes is normally expected to be noticeably poorer in impact strength than the nickel alloyed deposits such as those produced by AWS E-11018 electrodes. The chromium-molybdenum alloys are widely used for their advantages in creep strength and/or resistance to graphitization, but tougher chromium-molybdenum weld deposits would be of major interest to many users. In the past a manganese content near the top of its permissible range has been used in most welds in order to obtain the best possible as-welded toughness level. However, the higher manganese results in an appreciable drop in toughness when the welds are subjected to long terms stress relief, as well as rather poor toughness in the quenched and

TABLE V

| Example | 4 | 5 | 6 | 7 |
|---|---|---|---|---|
| Description | Base, no titanium in any form | Potassium titanate | $TiO_2$ pigment | 42% ferrotitanium. |
| Grams added to coating | No addition | 1.67 | 1.0 | .12. |
| Available titanium, percent of electrode wt. | 0 | .26 | .21 | .0176. |
| Titanium in deposit | Nil | .024 | .02 | d.003. |
| No. of test plates run | 3 | 2 | 1 | 2. |
| Average Charpy V-notch energy absorption, ft.-lbs.: | | | | |
| Room temperature | 180 | 250 | 224 | 197. |
| −100° F | 70 | 115+ | 111+ | 102+. |
| −150° F | 25 | 24 | 16 | 39. | d Derived from alloy recovery curves.

NOTE.—The plus sign after some of the values indicates that one of the bars tested at that temperature exceeded the 118 ft.-lb. capacity of the impact test machine. Since a wide spread in values is common in impact testing the average of several tests is customarily used.

The impact results for the deposit of example 4, the base composition, are far superior to those from prior art deposits of equal strength level. The toughness of the base can be still further increased by optimum levels of titanium added in various forms, as shown by the test results of examples 5, 6 and 7.

Similar series of tests were run at slag basicity levels of about 1.79, 2.44 and 3.9 and also at two carbon dioxide levels for each slag basicity —supplied respectively by 20 and 30 grams of calcium carbonate per 100 grams of coating. The weld metal deoxidation level was maintained at about the optimum point by adjusting the electrode deoxidizer contents slightly for changes in the carbonate content or for the addition of metallic titanium; although the strength levels changed somewhat with small variations in carbon and manganese recovery it was still possible to organize the data from these test series to find in broad terms the optimum electrode titanium additions as well as the maximum titanium which could be used with benefit in electrodes of our invention.

By organizing and plotting the test results from many E-XX18 type electrodes we have found that to be able to knowledgeably manage the quantities of titanium supplied from various source in the electrode it is necessary to take into account (1) the electrode slag basicity, (2) the quantity of carbon dioxide generated by the coating and (3) the location and form of the titanium present, metallic titanium in the core being more efficient than metallic titanium in the flux coating which in turn is more efficient than titanium in oxide form in the flux.

With respect to improved electrodes of our invention which produce basic slags we will now show (1) how high the titanium may go before deposit impact values have fallen back from the optimum to values equal to those of the starting point, (2) how titanium may be used to produce optimum impact improvements and (3) to about what levels the deposit titanium must be restricted to keep the deposit impact values above those characteristic of prior art deposits. In setting forth the relationships for controlling titanium, average welding conditions are assumed, all percentages are given in terms of electrode weight and the following terms are employed:

"percent electrode titanium as oxide present in the coating"

"percent electrode titanium as metal present in the coating"

"percent electrode $CO_2$ present in the coating"; derived from carbonate, for example calcium carbonate.

As above stated, impact testing of many series of E-XX18 electrode deposits made with our improved lime-fluoride electrodes has shown that the most successful use of our invention requires the management of titanium; from analysis of test data, limitations on the use of titanium have been generally determined. The data of table VI, secured by constructing curves for each series of an experimental electrode program, shows a direct relationship to exist between slag basicity and the maximum amount of titanium in oxide or metallic form which can be added with benefit to the coating of a titanium-free base composition. With graphical aid table VI was generalized into table VI-A, which shows that in respect to the stated effect on deposit impact strength 1 percent "electrode titanium as metal present in the coating" is about 2.6 times as effective as 1 percent "electrode titanium as oxide present in the coating." The factor 2.6, although only approximately correct over the range of slag basicities employed in the practice of our invention, serves as a practical factor to combine in one expression the effect of titanium when present in both the oxide and the metallic forms. Table VII shows the relationship between slag basicity and the maximum value for an expression providing for the presence of titanium in both oxide and metallic forms in the coating. Electrodes made with the maximum contents permitted produce deposits containing about 0.03 percent titanium.

A different principal applies to the limits on the level of titanium required to produce the optimum improvement in deposit impact properties at temperatures from −60° F. to −150° F. for the low alloy high strength electrodes of the Ni-Cr-Mo varieties and the nickel-bearing grades as represented by the 3-½ Ni type.

The sets of tests which produced the data of table VI also produced the data of table VIII, which relates optimum ranges of quantities of flux-borne titanium present in the electrode to "percent electrode $CO_2$ present in the coating" rather than to slag basicity. As columns A and B of this table show, when titanium as oxide is the only titanium source the optimum range for $$\frac{\text{Percent electrode titanium as oxide present in the coating}}{\text{Percent electrode } CO_2 \text{ present in the coating}}$$

is 0.039 to 0.133, and when titanium as metal is the only source the optimum range for $$\frac{\text{Percent electrode titanium as metal present in the coating}}{\text{Percent electrode } CO_2 \text{ present in the coating}}$$

is 0.0037 to 0.0116.

A comparison of these two expressions shows that, with respect to the optimum improvement of impact values, titanium in the metallic form is about 11 times as effective as it is in the oxide form when either is added through the coating. This factor of about 11 serves practically in combining in one expression the effects of titanium when present in both the oxide and metallic forms. In respect to optimum low temperature impact improvement a value of about 0.04 to about 0.13 is optimum for the expression $$\frac{\text{Percent electrode titanium as oxide present in the coating} + 11 \text{ times percent electrode titanium as metal present in the coating}}{\text{Percent electrode } CO_2 \text{ present in the coating}}$$

TABLE VI

| Slag basicity | Grams, $CaCO_3$ in the coating | Grams $CO_2$ in the coating | Percent electrode $CO_2$ present in the coating | Maximum quantity of titanium present in coating either as oxide or as metal to produce improvement over base | |
|---|---|---|---|---|---|
| | | | | Percent electrode titanium as oxide | Percent electrode titanium as metal |
| 1.79 | 31.7 | 13.6 | 4.75 | 1.68 | .98 |
| 2.44 | 20.0 | 8.6 | 3.02 | 1.68 | .59 |
| 3.9 | 20.0 | 8.6 | 3.02 | | .49 |
| 4.5 | 31.7 | 13.6 | 4.75 | .93 | .17 |
| 4.5 | 20.0 | 8.6 | 3.02 | .90 | .21 | tempered condition. Low manganese deposits show less toughness damage on stress relief and heat treatment but are generally of unsatisfactory toughness either as welded or as stress relieved. Improved electrodes according to our invention can often improve to an adequate level the toughness of alloy systems which are suitable metallurgically for stress relief and/or heat treatment.

Example 8 of table X illustrates improvements in impact strength attained in an AWS E-9018B3 deposit through our invention.

TABLE X

| Electrode description | Prior art E-9018B3 [1] | Invention Example 8 [2] |
|---|---|---|
| Electrode slag basicity | 1.48 | 4.42 |
| Hardness, Rockwell "C" Scale: | | |
| As welded | 32 | 38 |
| As stress relieved | 27 | 24 |
| Charpy V-notch after stress relief (1 hr. at 1275° F.), ft.-lbs.: | | |
| Room temperature | 52 | 172 |
| 0° F | 11 | 118+ |
| Deposit chemistry, percent: | | |
| Carbon | .060 | .110 |
| Manganese | .71 | .70 |
| Silicon | .67 | .35 |
| Chromium | 2.20 | 2.35 |
| Molybdenum | .98 | .77 |
| Sulfur | .016 | .0045 |
| Titanium | d <.045 | d <.045 |

[1] Standard silicate bound type.
[2] Like Example 1 but alloy addition changed to meet E-9018B3 chemistry.

d Derived from alloy recovery curves.

We have no fully satisfactory explanation of why the impact properties of deposits produced according to our invention are so much better than those that have been available in the past. It has been shown that the sulfur level is important in wrought nonaustenitic steels of intermediate and higher strength. All other factors being the same, major improvements in impact strength can be made if the sulfur is reduced to very low levels, below 0.01 percent. One of the reasons our basic slag is so beneficial would seem to be related to its ability to desulfurize steels. A welding slag with a basicity of about 4 will typically reduce the deposit sulfur level from a 0.025 percent sulfur core wire to below 0.01 percent sulfur. This ability to desulfurize is certainly beneficial, and must aid in obtaining good impact strength, yet it does not seem to be the full explanation of our good results. Coating s which produce high alumina slags are also very effective desulfurizers, and we have made many which have reduced the deposit sulfur level to the range 0.002 percent to 0.004 percent, yet these do not show the unprecedentedly good impact properties of the deposits made according to our invention. Similarly, conventional E-XX18 coatings are desulfurizing, although to a lesser extent, and when applied to low sulfur core wires containing 0.005 percent to 0.008 percent sulfur they can provide deposits containing only 0.002 percent to 0.004 percent sulfur, yet these deposits, while they have good impact strength, are not nearly as tough as deposits made in accordance with our invention.

It has also been proposed that the high oxygen content of covered electrode welds is the major damaging factor to deposit toughness, since oxygen is known to severely damage the impact strength of wrought materials. Analyses of conventional manual lime-fluoride electrode deposits show oxygen levels in the range of from 200 to 450 p.p.m. Lower oxygen levels are obtained with our invention, from 130 to 190 p.p.m., but when comparing pairs the better deposit often has a higher oxygen content. Thus again, while a general relationship exists and lower oxygen is undoubtedly beneficial, oxygen is not the full explanation. In wrought steels, 130 to 190 p.p.m. would be very detrimental to impact properties.

Our invention permits the use of inexpensive commercial quality core wires instead of very expensive high purity core wires. To illustrate, an electrode for producing weld deposits matching the low temperature impact properties of 9 percent nickel steel has been sought for years; a bare high purity wire for gas metal arc use has been reported, but it is very expensive, and even with the best and highest priced practices to control impurities the ability to deliver a minimum Charpy V-notch deposit impact strength of 25 ft. lbs. at −320° F. is not assured. However, in a series of eight tests alloyed electrodes according to our invention were made with two high purity vacuum melted core wires and six low carbon commercial core wires so that each would produce a 9 percent nickel weld deposit. At −320° F. the Charpy V-notch impact values of the deposits ranged from 42 to 47 ft. lbs.; no significant difference was found between those made using electrodes with the high purity high priced core wires and those made using electrodes with commercial quality core wires. When conventional coatings were used with the low priced wires the deposits were so poor in toughness that they were not worth considering, and even with the high priced wires conventional coatings did not produce satisfactory deposits.

Of the electrodes cited in table IV, the electrode of our invention was made with a commercial C1008 mild steel core wire containing 0.007 percent phosphorous and 0.02 percent sulfur, while the typical prior art electrodes were made with higher-cost higher-purity electric furnace core wires containing 0.01 percent max. phosphorous and 0.01 percent max. sulfur, typically containing around 0.006 percent of each element. Both wires result in a deposit with about 0.005 percent phosphorous and 0.004 percent sulfur.

While we have described certain present preferred embodiments of the invention and have illustrated certain present preferred methods of practicing the same, it is to be distinctly understood that the invention is not limited thereto but may be otherwise variously embodied and practiced within the scope of the following claims.

We claim:

1. A covered ferrous low hydrogen arc welding electrode of the class wherein a current conductive core is covered with a lime-fluoride coating, the electrode containing by weight about 45 percent to about 80 percent core and about 20 percent to about 55 percent coating, the coating containing by weight of the electrode 0 to about 30 percent alloying metal powder, about 2 percent to about 7 percent deoxidizer metal powder, about 4 percent to about 15 percent metal fluoride, about 5 percent to about 15 percent alkaline earth carbonate, 0 to about 10 percent slag builder and modifier and about 0.5 percent to about 8 percent inorganic binder material, the electrode producing a nonaustenitic steel weld metal deposit characterized by superior toughness in the Charpy V-notch impact test, the electrode containing base components selected from metallic and oxide forms of basic metals of the group consisting of lithium, sodium, potassium, cesium, magnesium, calcium, strontium and barium and acid components selected from metallic and oxide forms of acid metals of the group consisting of aluminum and silicon, said base components and acid components being so proportioned that when all components are melted together under the influence of an electric welding arc the electrode produces a welding slag with a basicity or mole ratio of oxide of basic metal to oxide of acid metal of at least 2.2, the electrode being restricted in sources of metallic and oxide forms of titanium so that when all components are melted together under the influence of an electric welding arc the electrode produces a weld metal deposit containing less than 0.07 percent titanium.

2. A covered ferrous low hydrogen arc welding electrode as claimed in claim 1 in which the required electrode deoxidation is supplied at least in part by magnesium in metallic form.

3. A covered ferrous low hydrogen arc welding electrode as claimed in claim 1 which produces a welding slag with a basicity of at least 3.

4. A covered ferrous low hydrogen arc welding electrode as claimed in claim 3 in which the required electrode deoxidation is supplied at least in part by magnesium in metallic form.

5. A covered ferrous low hydrogen arc welding electrode as claimed in claim 3 which produces a deposit containing less than 0.045 percent titanium.

6. A covered ferrous low hydrogen arc welding electrode as claimed in claim 5 in which the required electrode deoxidation is supplied at least in part by magnesium in metallic form.

7. A covered ferrous low hydrogen arc welding electrode as claimed in claim 1 which contains titanium-bearing components selected from metallic and oxide forms of titanium in such quantity that the maximum value for the expression percent electrode titanium as oxide present in the coating +2.6 times percent electrode titanium as metal present in the coating is related to the welding slag basicity according to the following schedule: 1.71 percent for a basicity of less than 3, 1.18 percent for a basicity of 3 to 4 and 0.89 percent for a basicity of over 4.

8. A covered ferrous low hydrogen arc welding electrode as claimed in claim 7 in which the required electrode deoxidation is supplied at least in part by magnesium in metallic form.

9. A covered ferrous low hydrogen arc welding electrode as claimed in claim 7 which produces a welding slag with a basicity of at least 3.

10. A covered ferrous low hydrogen arc welding electrode as claimed in claim 9 in which the required electrode deoxidation is supplied at least in part by magnesium in metallic form.

11. A covered ferrous low hydrogen arc welding electrode as claimed in claim 7 which produces a deposit containing less than 0.045 percent titanium.

12. A covered ferrous low hydrogen arc welding electrode as claimed in claim 7 in which the current conductive core comprises a mild steel wire.

13. A covered ferrous low hydrogen arc welding electrode as claimed in claim 1 which contains titanium-bearing components selected from metallic and oxide forms of titanium in such quantity that the ratio $$\frac{\text{Percent electrode titanium as oxide present in the coating} + 11 \text{ times percent electrode titanium as metal present in the coating}}{\text{Percent electrode } CO_2 \text{ present in the coating}}$$

has a value of 0.04 to 0.13.

14. A covered ferrous low hydrogen arc welding electrode as claimed in claim 13 which the required electrode deoxidation is supplied at least in part by magnesium in metallic form.

15. A covered ferrous low hydrogen arc welding electrode as claimed in claim 13 which produces a welding slag with a basicity of at least 3.

16. A covered ferrous low hydrogen arc welding electrode as claimed in claim 14 which produces a welding slag with a basicity of at least 3.

17. A covered ferrous low hydrogen arc welding electrode as claimed in claim 13 which produces a deposit containing less than 0.045 percent titanium.

18. A covered ferrous low hydrogen arc welding electrode as claimed in claim 13 in which the current conductive core comprises a mild steel wire.

* * * * *

UNITED STATES PATENT OFFICE
CERTIFICATE OF CORRECTION

Patent No. 3,627,574         Dated December 14, 1971

Inventor(s) William T. DeLong and Edwin R. Szumachowski

It is certified that error appears in the above-identified patent and that said Letters Patent are hereby corrected as shown below:

Column 3, lines 2 and 3 should read --[Calculation of basicity of welding slag produced by typical 5/32" 7018 low hydrogen electrode]--; line 36, "material" should be --materials--; line 57, "zierconia" should be --zirconia--; line 62, "metal" should be --metals--.  Column 4, line 1, after "often" insert --been--; line 59, "electrodes" should be --electrode--.  Column 5, line 19, after "much" insert --more--; line 33, "whereby" should be --where--; line 41, after "type" insert --electrode--; line 64, in the second column of the table insert --1.91 grams--.  Column 6, the first five lines of Table II should read as follows:

|  | Prior Art E-11018 | Invention Example 1 |
|---|---|---|
| Electrode slag basicity | 1.48 | 4.42 |
| Hardness, Rockwell "C" Scale | 29 | 33 |
| Charpy V-notch, ft-lbs |  |  |
| Room Temperature | 85 | 143 |
| -100° F. | 39 | 77 |

Same column, line 36, before "electrode" insert --the--.  Column 7, line 24, after "minimum" insert --but would not exceed the preferred lower limit of 3 minimum--; in Table IV, the first two lines under "Strength" should read as follows:

| Ultimate strength, ksi | 147 | 159 |
|---|---|---|
| Yield strength, ksi | 141 | 142 |

Column 9, line 13, after "impact" insert --test--.  Column 10, delete the free-hand horizontal lines appearing at approximately lines 37, 43 and 60; in Table VI delete the comma after "Grams" in the heading of the second column of the table; at the bottom of column 10 delete "101014     0466".  Column 11, rewrite Table IX as follows:

UNITED STATES PATENT OFFICE     SHEET 2
CERTIFICATE OF CORRECTION

Patent No. 3,627,574        Dated December 14, 1971

Inventor(s) William T. DeLong and Edwin R. Szumachowski

It is certified that error appears in the above-identified patent and that said Letters Patent are hereby corrected as shown below:

TABLE IX

| | | Minimum | Maximum |
|---|---|---|---|
| (a) | $\dfrac{\%\ \text{electrode titanium as oxide present in the coating}}{\%\ \text{electrode } CO_2 \text{ present in the coating}}$ | .05 | .11 |
| (b) | $\dfrac{11 \text{ times }\%\ \text{electrode titanium as metal present in the coating}}{\%\ \text{electrode } CO_2 \text{ present in the coating}}$ | .02 | .07 |
| | (a) plus (b) (which must lie between .04 and .13) | .07 | .13 |

Column 12, line 58, change "nonaustentici" to --non-austenitic--.
Column 13, line 48, "Coating s" should be --Coatings--; line 67, "p.p.m" should be --ppm--; line 18, "p.p." should be --ppm--.
Column 16, line 15 (claim 14, line 2), after "13" insert --in--.

UNITED STATES PATENT OFFICE SHEET 3

SECOND CERTIFICATE OF CORRECTION

Patent No. 3,627,574    Dated December 14, 1971

Inventor(s) William T. DeLong and Edwin R. Szumachowski

It is certified that error appears in the above-identified patent and that said Letters Patent are hereby corrected as shown below:

Column 12, the seventh and eighth (from the left) column headings of TABLE VIII should read as follows:

| % electrode titanium as oxide / % $CO_2$ (Col. A) | % electrode titanium as metal / % $CO_2$ (Col. B) |
| --- | --- |

Signed and sealed this 30th day of May 1972.

(SEAL)
Attest:

EDWARD M. FLETCHER, JR.         ROBERT GOTTSCHALK
Attesting Officer               Commissioner of Patents